(12) United States Patent
Parasuram et al.

(10) Patent No.: US 12,491,915 B2
(45) Date of Patent: Dec. 9, 2025

(54) AUTONOMOUS VEHICLE DRIVING PATH SELECTION IN THE PRESENCE OF EMERGENCY VEHICLE SOUNDS

(71) Applicant: Waymo LLC, Mountain View, CA (US)

(72) Inventors: Aishwarya Parasuram, Sunnyvale, CA (US); Xin Liu, Mountain View, CA (US); Jennifer C. Taylor, Palo Alto, CA (US); Samuel Liu, Mountain View, CA (US); Nayun Xu, Mountain View, CA (US); Brandon Luders, Sunnyvale, CA (US); Enrique Fernandez Gonzalez, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 29 days.

(21) Appl. No.: 18/535,705

(22) Filed: Dec. 11, 2023

(65) Prior Publication Data

US 2025/0187635 A1    Jun. 12, 2025

(51) Int. Cl.
*B60W 60/00* (2020.01)

(52) U.S. Cl.
CPC ... *B60W 60/0027* (2020.02); *B60W 2420/403* (2013.01); *B60W 2420/408* (2024.01);
(Continued)

(58) Field of Classification Search
CPC .... B60W 30/08; B60W 30/09; B60W 30/095; B60W 30/0953; B60W 30/0956; B60W 30/16; B60W 50/0097; B60W 60/001; B60W 60/0017; B60W 60/0018; B60W 60/0027; B60W 60/00274; B60W 2300/105; B60W 2420/54; B60W 2420/403; B60W 2420/408; B60W 2554/402; B60W 2554/4042;
(Continued)

(56) References Cited

U.S. PATENT DOCUMENTS

| 10,319,228 B2 * | 6/2019 | Silver .................. G01S 3/8083 |
| 2017/0249839 A1 * | 8/2017 | Becker ............ G08G 1/096725 |

(Continued)

OTHER PUBLICATIONS

Extended European Search Report for European Patent Application No. 24218970.2, mailed Apr. 10, 2025, 10 pages.

*Primary Examiner* — Brandon Z Willis
(74) *Attorney, Agent, or Firm* — Lowenstein Sandler LLP

(57) ABSTRACT

The described aspects and implementations support sound-based emergency vehicle detection, localization, and tracking for autonomous vehicle and driver-assist systems. The techniques include obtaining, using one or more audio detectors of a vehicle, a sound recording that includes a sound emitted by an emergency vehicle (EV). The techniques further include applying a sound localization (SL) model to the sound recording to obtain a SL output, which includes a first map of possible locations of the EV in a driving environment of the vehicle and can further include a second map of possible velocities of the EV. The techniques further include simulating, using the SL output, trajectories of simulated EV(s) in the driving environment of the vehicle, and causing, responsive to proximity of the simulated trajectories to a driving path of the vehicle, modification of the driving path of the vehicle.

20 Claims, 7 Drawing Sheets

(52) U.S. Cl.
CPC ... *B60W 2420/54* (2013.01); *B60W 2554/402* (2020.02); *B60W 2554/4042* (2020.02)

(58) Field of Classification Search
CPC .......... B60W 2554/80; B60W 2754/10; G06V 20/56; G06V 20/58; G08G 1/16; G05D 1/02; G05D 1/0212; G05D 1/0214; G05D 1/0223; G05D 1/0255; G05D 1/617; G05D 1/633; G05D 2105/55; G05D 2111/20
See application file for complete search history.

(56) References Cited

U.S. PATENT DOCUMENTS

| | | | |
|---|---|---|---|
| 2020/0379108 A1* | 12/2020 | Vijayalingam | G06V 20/58 |
| 2021/0302988 A1* | 9/2021 | Chebiyyam | G01S 7/4861 |
| 2022/0024484 A1* | 1/2022 | Armstrong-Crews | B60W 40/02 |
| 2023/0033315 A1* | 2/2023 | Tariq | G08G 1/096791 |

* cited by examiner

AUTONOMOUS VEHICLE DRIVING PATH SELECTION IN THE PRESENCE OF EMERGENCY VEHICLE SOUNDS

TECHNICAL FIELD

The instant specification generally relates to autonomous vehicles and driver assistance systems. More specifically, the instant specification relates to autonomous vehicle driving path selection in the presence of emergency vehicle sounds.

BACKGROUND

An autonomous (fully and partially self-driving) vehicle (AV) operates by sensing an outside environment with various electromagnetic (e.g., radar and optical) and non-electromagnetic (e.g., audio and humidity) sensors. Some autonomous vehicles chart a driving path through the environment based on the sensed data. The driving path can be determined based on Global Positioning System (GPS) data and road map data. While the GPS and the road map data can provide information about static aspects of the environment (buildings, street layouts, road closures, etc.), dynamic information (such as information about other vehicles, pedestrians, street lights, etc.) is obtained from contemporaneously collected sensing data. Precision and safety of the driving path and of the speed regime selected by the autonomous vehicle depend on timely and accurate identification of various objects present in the outside environment and on the ability of a driving algorithm to process the information about the environment and to provide correct instructions to the vehicle controls and the drivetrain.

BRIEF DESCRIPTION OF THE DRAWINGS

The present disclosure is illustrated by way of examples, and not by way of limitation, and can be more fully understood with references to the following detailed description when considered in connection with the figures, in which.

SUMMARY

Figure 1:
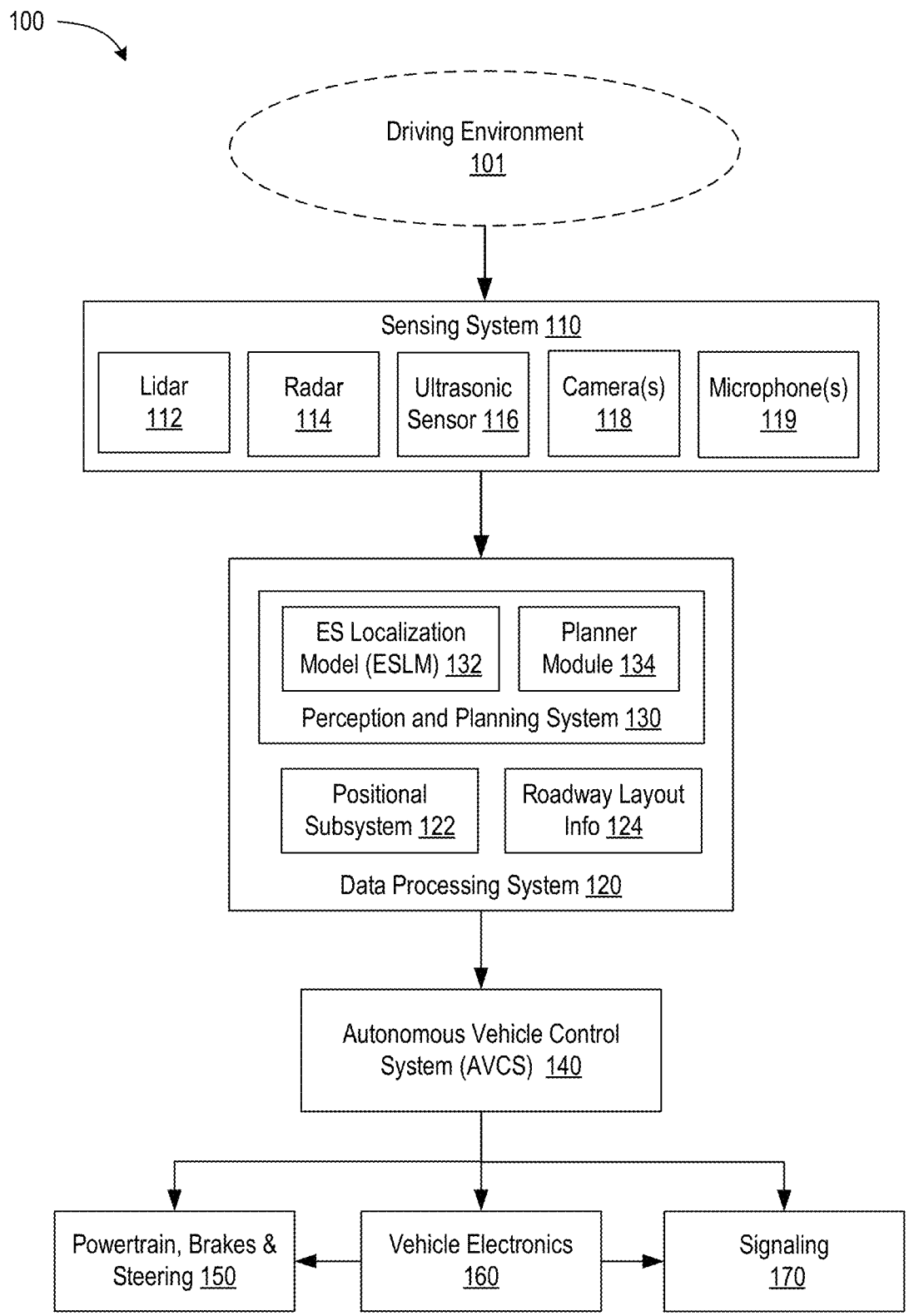
FIG. 1 is a diagram illustrating components of an example autonomous vehicle capable of estimating EV localization using sound detection and processing techniques and determining a driving path of an autonomous vehicle, in accordance with some implementations of the present disclosure.

In one implementation, disclosed is a method that includes obtaining, using one or more audio detectors of a vehicle, a sound recording comprising a sound emitted by an emergency vehicle (EV). The method further includes applying, using a processing device, a sound localization (SL) model to the sound recording to generate an SL output. The SL output includes a first map of possible locations of the EV in a driving environment of the vehicle. The method further includes simulating, by the processing device and using the SL output, trajectories of one or more simulated EVs in the driving environment of the vehicle, and causing, responsive to proximity of one or more of the simulated trajectories to a driving path of the vehicle, the driving path of the vehicle to be modified.

In another implementation, disclosed is a method that includes a sensing system of a vehicle and a perception system of the vehicle. The sensing system includes one or more audio detectors configured to obtain a sound recording comprising a sound emitted by an EV. The perception system is configured to apply an SL model to the sound recording to obtain an SL output that includes a first map of possible locations of the EV in a driving environment of the vehicle. The perception system is further configured to simulate, using the SL output, trajectories of one or more simulated EVs in the driving environment of the vehicle. The perception system is further configured to cause, responsive to proximity of one or more of the simulated trajectories to a driving path of the vehicle, the driving path of the vehicle to be modified.

In another implementation, disclosed is a non-transitory computer-readable storage medium storing instructions that, when executed by a processing device cause the processing device to perform operations that include obtaining, using one or more audio detectors of a vehicle, a sound recording comprising a sound emitted by an EV. The operations further include applying an SL model to the sound recording to generate an SL output that includes a first map of possible locations of the EV in a driving environment of the vehicle. The operations further include simulating, using the SL output, trajectories of one or more simulated EVs in the driving environment of the vehicle, and causing, responsive to proximity of one or more of the simulated trajectories to a driving path of the vehicle, the driving path of the vehicle to be modified.

DETAILED DESCRIPTION

An autonomous vehicle (AV) or a vehicle deploying various driving assistance techniques can use multiple sensor modalities to facilitate detection of objects in an outside environment and determine a trajectory of motion of such objects. The sensors can include radio detection and ranging (radar) sensors, light detection and ranging (lidar) sensors, multiple digital cameras, audio sensors (microphones), positional sensors, and the like. Different types of sensors can provide different and complementary benefits. For example, radars and lidars emit electromagnetic signals (radio signals or optical signals) that reflect from the objects and carry back information about distances to the objects (e.g., from the time of flight of the signals) and velocities of the objects (e.g., from the Doppler shift of the frequencies of the reflected signals). Radars and lidars can scan an entire 360-degree view by using a series of consecutive sensing frames. Sensing frames can include numerous reflections covering the outside environment in a dense grid of return points. Each return point can be associated with the distance to the corresponding reflecting object and a radial velocity (a component of the velocity along the line of sight) of the reflecting object. Cameras (e.g., photographic or video cameras) can acquire high resolution images at short and long distances and complement lidar and radar data. Microphones can detect meaningful sounds like sirens, honks railroad crossing bells, train horns, and/or the like.

Lidars, radars, and cameras (including infrared cameras) operate using electromagnetic waves with relatively small wavelengths (with radars having the longest wavelength in the centimeter range or even less). As a result, sensing data acquired by electromagnetic sensors is largely limited to direct line-of-sight detections. Human drivers, on the other hand, have sensory capabilities that extend beyond the line-of-sight perception. In particular, human drivers can hear sirens of approaching emergency vehicles despite the emergency vehicles being obscured by other vehicles or buildings, including situations where emergency vehicles approach along different (e.g., perpendicular) streets, and/or the like. Even though emergency vehicles (EVs) may have recognizable shapes and appearances (e.g., fire trucks, ambulances, etc.) and are equipped with emergency lights, timely detection of emergency vehicles on rescue missions based solely on detection of emergency lights and/or vehicle appearances is challenging and may be insufficient in many situations. Sound waves of emergency sirens, however, typically have wavelengths in the range of 20-90 centimeters and are, therefore, quite efficient in carrying sounds around obstacles. Human hearing can extract a lot of useful information from sound waves, such as a distance and a direction to a source of the sound (even when the source is not directly visible), state of motion of the source (e.g., stationary, approaching, departing, passing by, and/or the like), estimate (to some degree) a speed of this motion, and/or the like. Existing computer systems, and autonomous driving systems in particular, still do not have a capability that would match or approach human hearing and perception. Accordingly, an AV that detects an emergency sound (e.g., a siren) may struggle in selecting an optimal driving path. For example, out of abundance of caution, the AV can pull over to the side of the road or stop before entering an intersection even in those instances where an EV has already passed the intersection or is moving away from the AV. This can be confusing to other road participants (e.g., human drivers) and can lead to traffic congestion and/or creation of unsafe driving conditions.

Aspects and implementations of the present disclosure address these and other challenges of the existing autonomous driving technology by disclosing methods and systems that determine likely locations of emergency vehicles on drivable roadways in an environment of a vehicle, e.g., an AV. Determining such locations—referred to as localization herein—can include a combination of machine learning techniques, which estimate likely directions and distances to the sources of audible EV signals, and drivable roadway layout data. More specifically, a digital representation of a sound in the environment of the AV, e.g., spectrograms of audio data (e.g., collected by microphones), can be used as an input into a sound localization model that outputs a probability map that a source of the EV sound is located at some position relative to the AV. A planner module of the AV can then superimpose the probability map-considered as the map of initial hypotheses of EV locations-on the drivable roadway layout to eliminate at least some portion of the probability map. For example, one portion of the probability map can correspond to undrivable areas of the environment, e.g., areas occupied by buildings or structures, fenced-off areas, impassable areas, and/or the like, and can thus be eliminated from the probability map. Another portion of the probability map can be identified (e.g., based on the drivable roadway layout and on-board sensing data) as a visible (to the sensing system of the AV) portion of the environment. Such a portion can also be eliminated from the probability map, under the assumption that the presence of flashing lights (that accompany EV sounds) would have been detected by the sensing system, if the EV had been located in the visible region of the environment. Yet another portion of the probability map can be eliminated based on the corresponding probabilities being too low, e.g., below an empirically set threshold.

The resulting area (referred to as the candidate area herein) may be used by the planner module of the AV for EV motion simulations. More specifically, the planner module can place simulated (hypothesized) EVs within the candidate area. Simulated EVs can be given both a position and a velocity (understood as both the speed of the motion and its direction), and the planner module (which can be part of a vehicle's perception and planning system) can predict the motion of the simulated EVs to determine if the EV will pass close (e.g., closer than an empirically set minimum distance) to the AV and/or if the EV path can be impeded by the AV's motion or position. In some implementations, the output of sound localization model can further include probability of various velocities V of likely sources of the EV sounds. The velocities predicted by the sound localization model can be used to constrain a motion of the simulated EVs (which otherwise can be sampled from a broad range of velocities to account for a possibility that an EV can travel with a speed that is much higher than the average speed of other vehicles in the environment and/or a maximum legal speed. The obtained, by the planner, trajectories of various simulated EVs span a region of the environment (referred to as an EV-active area herein) where the EV may move within a certain time horizon, e.g., 1 second, 2 seconds, 3 seconds, 5 seconds, or some other time. The driving path of the AV can then be selected or modified to avoid entering the EV-active area for these time horizons. For example, if EV is determined to be located in an occluded EV-active area but is moving away from the AV (rather than approaching the AV), such EV-active area can be eliminated from further consideration.

In some instances, e.g., because of the high level of acoustic noise in the environment, the sound localization model can output the probability map (of locations and/or velocities of possible EVs) with a low confidence, e.g., value below a threshold confidence. In such instances, planner can place simulated EVs in the entire occluded area not visible to the sensing system and run simulations that are unconstrained by the speed of the simulated EVs, e.g., up to the maximum velocity that is set sufficiently high, e.g., twice the maximum legal speed for the area or even more. The motion of the simulated EVs need not be constrained to a certain side of the road (e.g., the right side), as EVs may travel against the traffic, on some occasions. Numerous other implementations and uses of the disclosed systems and techniques are illustrated below.

The advantages of the disclosed systems and techniques include, but are not limited to obtaining timely and accurate estimates of trajectories of EVs and selecting efficient and safe driving paths of the AV. This ensures that, on one hand, the AV avoids entering active areas where the EV has a likelihood to be while, on the other hand, prevents the AV from making unnecessary stops and/or slowdowns that can confuse other road users and create traffic congestions or possibilities of vehicle collisions.

In those instances where description of implementations refers to autonomous vehicles, it should be understood that similar techniques can be used in various driver assistance systems that do not rise to the level of fully autonomous driving systems. More specifically, disclosed techniques can be used in Level 2 driver assistance systems that implement steering, braking, acceleration, lane centering, adaptive cruise control, etc., as well as other driver support. Likewise, the disclosed techniques can be used in Level 3 driving assistance systems capable of autonomous driving under limited (e.g., highway) conditions. In such systems, timely and accurate detection of approaching EVs can be used to inform the driver that a change of the driving path may be advisable (e.g., in Level 2 systems), or to make certain driving decisions (e.g., in Level 3 systems), such as reducing speed, pulling over to a side of the road, and/or the like, without requesting driver's feedback.

FIG. 1 is a diagram illustrating components of an example autonomous vehicle (AV) 100 capable of estimating EV localization using sound detection and processing techniques and determining a driving path of an autonomous vehicle, in accordance with some implementations of the present disclosure. Autonomous vehicles can include motor vehicles (cars, trucks, buses, motorcycles, all-terrain vehicles, recreational vehicles, any specialized farming or construction vehicles, and the like), aircraft (planes, helicopters, drones, and the like), naval vehicles (ships, boats, yachts, submarines, and the like), or any other self-propelled vehicles (e.g., robots, factory or warehouse robotic vehicles, sidewalk delivery robotic vehicles, etc.) capable of being operated in a self-driving mode (without a human input or with a reduced human input).

As described herein, in a semi-autonomous or partially autonomous driving mode, even though the vehicle assists with one or more driving operations (e.g., steering, braking and/or accelerating to perform lane centering, adaptive cruise control, advanced driver assistance systems (ADAS), or emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods may be described below in conjunction with autonomous vehicles, similar techniques can be used in various driver assistance systems that do not rise to the level of fully autonomous driving systems. In the United States, the Society of Automotive Engineers (SAE) have defined different levels of automated driving operations to indicate how much, or how little, a vehicle controls the driving, although different organizations, in the United States or in other countries, may categorize the levels differently. More specifically, disclosed systems and methods can be used in SAE Level 2 (L2) driver assistance systems that implement steering, braking, acceleration, lane centering, adaptive cruise control, etc., as well as other driver support. The disclosed systems and methods can be used in SAE Level 3 (L3) driving assistance systems capable of autonomous driving under limited (e.g., highway) conditions. Likewise, the disclosed systems and methods can be used in vehicles that use SAE Level 4 (LA) self-driving systems that operate autonomously under most regular driving situations and require only occasional attention of the human operator. In all such driving assistance systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

A driving environment 101 can include any objects (animate or inanimate) located outside the AV, such as roadways, buildings, trees, bushes, sidewalks, bridges, mountains, other vehicles, pedestrians, and so on. The driving environment 101 can be urban, suburban, rural, and so on. In some implementations, the driving environment 101 can be an off-road environment (e.g., farming or other agricultural land). In some implementations, the driving environment can be an indoor environment, e.g., the environment of an industrial plant, a shipping warehouse, a hazardous area of a building, and so on. In some implementations, the driving environment 101 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.) and/or roadways that are located in the hillside, such that vehicles can have limited visibility of other vehicles and objects, when a direct line of sight is obscured by the ground terrain. Hereinafter, the term "driving environment" should be understood to include all environments in which an autonomous motion of self-propelled vehicles can occur. For example, "driving environment" can include any possible flying environment of an aircraft or a marine environment of a naval vessel. The objects of the driving environment 101 can be located at any distance from the AV, from close distances of several feet (or less) to several miles (or more).

Although, for brevity and conciseness, various systems and methods may be described below in conjunction with autonomous vehicles, similar techniques can be used in various driver assistance systems that do not rise to the level of fully autonomous driving systems. In the United States, the Society of Automotive Engineers (SAE) have defined different levels of automated driving operations to indicate how much, or how little, a vehicle controls the driving, although different organizations, in the United States or in other countries, may categorize the levels differently. More specifically, disclosed systems and methods can be used in SAE Level 2 (L2) driver assistance systems that implement steering, braking, acceleration, lane centering, adaptive cruise control, etc., as well as other driver support. The disclosed systems and methods can be used in SAE Level 3 (L3) driving assistance systems capable of autonomous driving under limited (e.g., highway) conditions. Likewise, the disclosed systems and methods can be used in vehicles that use SAE Level 4 (LA) self-driving systems that operate autonomously under most regular driving situations and require only occasional attention of the human operator. In all such driving assistance systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

The example AV 100 can include a sensing system 110. The sensing system 110 can include various electromagnetic (e.g., optical) and non-electromagnetic (e.g., acoustic) sensing subsystems and/or devices. The sensing system 110 can include a radar 114 (or multiple radars 114), which can be any system that utilizes radio or microwave frequency signals to sense objects within the driving environment 101 of the AV 100. The radar(s) 114 can be configured to sense both the spatial locations of the objects (including their spatial dimensions) and velocities of the objects (e.g., using the Doppler shift technology). Hereinafter, "velocity" refers to both how fast the object is moving (the speed of the object) as well as the direction of the object's motion. The sensing system 110 can include a lidar 112, which can be a laser-based unit capable of determining distances to the objects and velocities of the objects in the driving environment 101. Each of the lidar 112 and radar 114 can include a coherent sensor, such as a frequency-modulated continuous-wave (FMCW) lidar or radar sensor. For example, radar 114 can use heterodyne detection for velocity determination. In some implementations, the functionality of a ToF and coherent radar is combined into a radar unit capable of simultaneously determining both the distance to and the radial velocity of the reflecting object. Such a unit can be configured to operate in an incoherent sensing mode (ToF mode) and/or a coherent sensing mode (e.g., a mode that uses heterodyne detection) or both modes at the same time. In some implementations, multiple lidars 112 or radars 114 can be mounted on AV 100.

Lidar 112 can include one or more light sources producing and emitting signals and one or more detectors of the signals reflected back from the objects. In some implementations, lidar 112 can perform a 360-degree scanning in a horizontal direction. In some implementations, lidar 112 can be capable of spatial scanning along both the horizontal and vertical directions. In some implementations, the field of view can be up to 90 degrees in the vertical direction (e.g., with at least a part of the region above the horizon being scanned with radar signals). In some implementations, the field of view can be a full sphere (consisting of two hemispheres).

The sensing system 110 can further include one or more cameras 118 (which can include one or more infrared sensors) to capture images of the driving environment 101. The images can be two-dimensional projections of the driving environment 101 (or parts of the driving environment 101) onto a projecting surface (flat or non-flat) of the camera(s). Some of the cameras 118 of the sensing system 110 can be video cameras configured to capture a continuous (or quasi-continuous) stream of images of the driving environment 101. The sensing system 110 can further include one or more ultrasonic sensors 116, which can be used used to identify objects located close to AV 100 and/or support parking and other AV driving at low speeds, in some implementations. The sensing system 110 can also include one or more microphones 119, which can be positioned around AV 100. In some implementations, microphones 119 can be arranged into microphone arrays of two or more microphones each. AV 100 can have multiple such microphone arrays, e.g., four microphone arrays, eight microphone arrays, or some other number of microphone arrays. In one example, two microphone arrays can be deployed near front-left and front-right corners of AV 100 and two microphone arrays can be deployed near rear-left and rear-right corners of AV 100. In some implementations, different microphones of a given array can be located at distances of 1-5 centimeters from each other. In some implementations, microphones can be located at larger distances from each other, e.g., up to 10 cm or more. In some implementations, microphones within a given array can be time-synchronized. In some implementations, different arrays of microphones are not synchronized. In some implementations, microphones can also be synchronized across different arrays.

The sensing data obtained by the sensing system 110 can be processed by a data processing system 120 of AV 100. The data processing system 120 can include a perception and planning system 130. The perception system 130 can be configured to detect and track objects in the driving environment 101 and to recognize the detected objects. For example, the perception and planning system 130 can analyze images captured by the cameras 118 and can further be capable of detecting traffic light signals, road signs, roadway layouts (e.g., boundaries of traffic lanes, topologies of intersections, designations of parking places, and so on), presence of obstacles, and the like. The perception and planning system 130 can also receive radar sensing data (Doppler data and ToF data) to determine distances to various objects in the environment 101 and velocities (radial and, in some implementations, transverse, as described below) of such objects. In some implementations, the perception and planning system 130 can use radar data in combination with the data captured by the camera(s) 118, as described in more detail below.

The perception and planning system 130 can include a number of components and/or modules that facilitate detection and localization of EVs, as disclosed herein. In some implementations, perception system 130 can deploy an emergency sound localization model (ESLM) 132 that uses audio data collected by microphones 119 and estimates a distance D to a source, a direction θ to the source (azimuthal angle or bearing), and a velocity $\vec{V}$ (which can be expressed via Cartesian components $V_x$, $V_y$, polar components $V_D$, $V_θ$, or as any other suitable combination).

The perception and planning system 130 can also include a behavior prediction module (not shown explicitly), which can monitor how the driving environment 101 evolves with time, e.g., by keeping track of the locations and velocities of the animate objects (e.g., relative to Earth). In some implementations, the behavior prediction module can keep track of the changing appearance of the environment due to a motion of the AV relative to the environment. In some implementations, the behavior prediction module can make predictions about how various tracked objects of the driving environment 101 will be positioned within a prediction time horizon. The predictions can be based on the current locations and velocities of the tracked objects, including EVs whose locations are determined using outputs of ESLM 132. In some implementations, output of ESLM 132 can be combined with outputs of lidar/radar/camera-based object tracking.

In some implementations, after ESLM 138 has determined probability maps predicting an approximate distance, direction to, and/or velocity of an occluded EV (e.g., a fire truck) with a turned-on siren, a planner module 134 can run simulations to predict a set of locations (trajectory) $\vec{R}(t_1)$, $\vec{R}(t_2)$, ... $\vec{R}(t_N)$ for the EV at one or more future instances of time $t_1$, $t_2$, ... $t_N$, which may be spaced at certain time intervals, e.g., 0.5 sec, or some other intervals. The planner module 134 can provide the predicted trajectory $\{\vec{R}(t_j)\}$ to an autonomous vehicle control system (AVCS) 140. The AVCS then determines how a current trajectory of AV 100 is to be modified to allow a safe passage of the EV. If the EV becomes visible, the sensing system 110 can use electromagnetic sensing data collected by lidar 112, radar 114, and/or one or more cameras 118 to identify (e.g., by detecting the emergency lights and/or based on visual appearance) the EV. The planner module 134 can then track EV's further trajectory using this electromagnetic sensing data until the EV departs from the environment of the AV.

Perception and planning system 130 can also receive information from a positioning subsystem 122, which can include a GPS transceiver and/or inertial measurement unit (IMU), configured to obtain information about the position of the AV relative to Earth and its surroundings. The positioning subsystem 122 can use the positioning data, e.g., GPS data and IMU data in conjunction with the sensing data to help accurately determine the location of the AV 100 with respect to fixed objects of the driving environment 101 (e.g., roadways, lane boundaries, intersections, sidewalks, crosswalks, road signs, curbs, surrounding buildings, etc.) whose locations can be provided by roadway layout information 124. In some implementations, the data processing system 120 can receive non-electromagnetic data, such as audio data (e.g., ultrasonic sensor data, or data from a mic picking up emergency vehicle sirens), temperature sensor data, humidity sensor data, pressure sensor data, meteorological data (e.g., wind speed and direction, precipitation data), and the like.

The AVCS 140 can include one or more algorithms that control how AV is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain, brakes, and steering 150, vehicle electronics 160, signaling 170, and other systems and components not explicitly shown in FIG. 1. The powertrain, brakes, and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions output by the AVCS 140 can be delivered directly to the powertrain, brakes, and steering 150 (or signaling 170) whereas other instructions output by the AVCS 140 are first delivered to the vehicle electronics 160, which generates commands to the powertrain, brakes, and steering 150 and/or signaling 170.

In one example, the AVCS 140 can determine that an obstacle identified by the data processing system 120 is to be avoided by decelerating the vehicle until a safe speed is reached, followed by steering the vehicle around the obstacle. The AVCS 140 can output instructions to the powertrain, brakes, and steering 150 (directly or via the vehicle electronics 160) to: (1) reduce, by modifying the throttle settings, a flow of fuel to the engine to decrease the engine rpm; (2) downshift, via an automatic transmission, the drivetrain into a lower gear; (3) engage a brake unit to reduce (while acting in concert with the engine and the transmission) the vehicle's speed until a safe speed is reached; and (4) perform, using a power steering mechanism, a steering maneuver until the obstacle is safely bypassed. Subsequently, the AVCS 140 can output instructions to the powertrain, brakes, and steering 150 to resume the previous speed settings of the vehicle.

The "autonomous vehicle" can include motor vehicles (cars, trucks, buses, motorcycles, all-terrain vehicles, recreational vehicle, any specialized farming or construction vehicles, and the like), aircrafts (planes, helicopters, drones, and the like), naval vehicles (ships, boats, yachts, submarines, and the like), robotic vehicles (e.g., factory, warehouse, sidewalk delivery robots, etc.) or any other self-propelled vehicles capable of being operated in a self-driving mode (without a human input or with a reduced human input). "Objects" can include any entity, item, device, body, or article (animate or inanimate) located outside the autonomous vehicle, such as roadways, buildings, trees, bushes, sidewalks, bridges, mountains, other vehicles, piers, banks, landing strips, animals, birds, or other things.

Figure 2A:
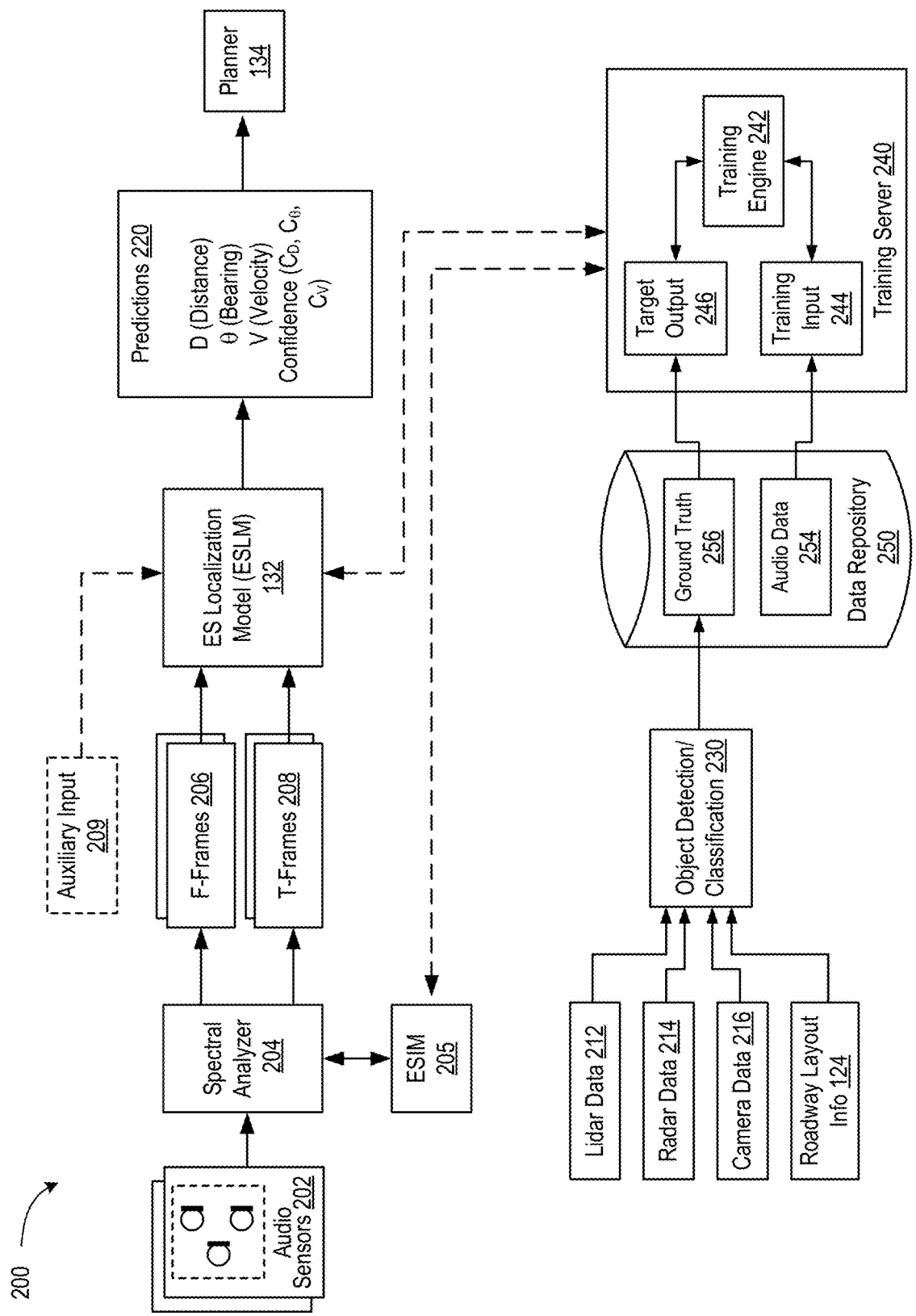
FIG. 2A is a diagram illustrating an example sound-based emergency vehicle detection, localization, and tracking pipeline that can be used as part of an autonomous vehicle's perception and planning system, in accordance with some implementations of the present disclosure.

FIG. 2A is a diagram illustrating an example sound-based emergency vehicle detection, localization, and tracking pipeline 200 that can be used as part of an autonomous vehicle's perception and planning system, in accordance with some implementations of the present disclosure. Sound separation and processing pipeline 200 can include audio sensors 202, such as microphones 119 of FIG. 1, which can be arranged into one or more time-synchronized arrays and located, e.g., around the perimeter of the AV. Microphones in a microphone array can be located at distances of 1-5 cm from each other. In some implementations, microphones in an array can be located at distances smaller than 1 cm or larger than 5 cm (e.g., 10 cm or more). Microphones can be unidirectional (cardioid) microphones, bi-directional microphones, omnidirectional microphones, dynamic microphones, multi-pattern microphones, and/or some combination thereof. In some implementations, an array of microphones can include directional microphones with different orientations of the maximum-sensitivity axis.

Sounds collected by audio sensors 202 can be in any suitable raw audio format, in spectrogram form, or in some other digital format. More specifically, an audio sensor 202 can convert variations of air pressure caused by arriving sound waves into analog electromagnetic signals and, in some implementations, digitize these analog signals. The digitized signals can be provided to a spectral analyzer 204 that computes Fourier transforms (e.g., using Fast Fourier transforms) for various time intervals of a predetermined duration to obtain audio frames. Individual audio frames can represent audio content in a respective time interval. In some implementations, the amplitude of the signals in the frequency domain can be represented using a logarithmic (decibel) scale. In some implementations, the spectrograms can be mel-spectrograms, with frequency f (measured in Hz) converted to the mel domain according to, $f \to m = 1607 \cdot \ln(1+f/700)$, or a similar transformation.

The audio frames can be input into an emergency sound localization model (ESLM) 132 trained to generate predictions 220 about locations and a state of motion of EVs in the outside environment. In some implementations, inputs into ESLM 132 can include frames (or spectrograms) of multiple types. For example, F-frames 206 can have a high frequency resolution to efficiently capture frequency content of the sound waves detected by audio sensors 202. High frequency resolution can be achieved by long sampling times. High frequency resolution allows ESLM 132 to identify signatures of changing tone and amplitude of the sound waves and ensure good accuracy in detecting distances D to sources of emergency sounds. T-frames 208 can have a high temporal resolution to efficiently capture differences in sound arrival times at different microphones of time-synchronized arrays. High temporal resolution can be achieved by a shortened spacing of points used in the Fourier transforms (high sampling rate). High temporal resolution allows ESLM 132 to identify orientation of wave fronts of arriving sound waves and, therefore, ensure good accuracy in detecting directions θ to sources of emergency sounds. Both F-frames 206 and T-frames 208 can provide information that improves accuracy of the velocity detection, as the velocity can include both the radial velocity $V_D = \Delta D/\Delta t$ (which is related to changes in distance ΔD that are efficiently tracked via evolution of F-frames 206) and the azimuthal velocity $V_\theta = D\Delta\theta/\Delta t$ (which is related to changes in azimuth (bearing) 40 that are efficiently tracked via evolution of T-frames 208).

More specifically, a complex signal S(t) detected by any given audio sensor 202 can be sampled N times over a window T, e.g., using a suitable analog-to-digital (ADC) converter of spectral analyzer 204 to produce a set of (temporal) points $t_j = jT/N$, where j=0, 1, 2, . . . , N−1. Spectral analyzer 204 can then apply an N-point Fourier transform to the signal $S(t_j)$ to generate a set of N complex Fourier coefficients $S(f_k)$, e.g., as follows, $$S(f_k) = \sum_{j=0}^{N-1} S(t_j) e^{2\pi i f_k t_j},$$

where frequencies are $f_k = k/T$, with k=0, 1, 2, . . . , N−1.

F-frames 206 can be produced by selecting longer time intervals, e.g., T=2 sec, 3 sec, etc. Correspondingly, to ensure that a frequency f=650-1000 Hz of typical EV sounds is properly detected, the maximum frequency $f_{MAX} \approx N/T$ should be larger than frequency f, e.g., should exceed frequency f by some factor $f_{MAX} > 2$, 3, etc. For example, when T=3 sec and f=1000 Hz, selecting $N=10^4$ ensures that $f_{MAX}/f \approx 3.3$.

T-frames 208 can be produced by selecting shorter time intervals, such that individual points of the Fourier transform are separated by times that are short enough to be sensitive to the difference of times of sound arrival at different audio sensors 202 (to capture directional dependence of the arriving sound waves). For example, in a microphone array in which microphones are spaced by 10 cm apart, the sound can arrive at different microphones with the time difference of order $$\Delta t \approx \frac{5 \text{ cm}}{340 \text{ m/sec}} \approx 1.5 \times 10^{-4} \text{ sec}$$

(which is the time it takes the sound to cover half the distance between the microphones, e.g., 5 cm in this example) Correspondingly, to ensure that such times are sufficiently well resolved, the separation of individual points of the Fourier transform T/N should be substantially less (e.g., by a factor 2, 3, . . . etc.) than Δt. For the same number of points, $N=10^4$, this implies that the duration of the sampling window can be T=0.5 sec or less (e.g., 0.3 sec, 0.2 sec, and so on) to ensure that the spacing $T/N=0.5 \times 10^{-4}$ sec is at least three times less than the target time difference Δt.

The durations of the sampling window T and the sampling rate N/T for F-frames 206 and for T-frames 208 should be understood as a way of example and not limitation. In some implementations, for higher resolution, the sampling window duration T may be more than 3 seconds for F-frames 206, and less than 0.5 seconds for T-frames 208. Higher resolution (in both types of frames) can be achieved by using Fourier transforms with a higher number of points N than $10^4$. Although in the implementation illustrated above the number of points N used for obtaining F-frames 206 and T-frames 208 is the same, in other implementations, the number of points used for obtaining F-frames 206 and T-frames 208 can be different. Although, for brevity and conciseness, transformations from the audio signal $S(t_j)$ to the Fourier spectrogram $S(f_k)$ is described, in other implementations the audio signal $S(t_j)$ can be represented in the mel-spectrogram form.

In some implementations, the spectrograms $S(f_k)$ can include separate spectrograms for the real part $S'(t_j)$ and the imaginary part $S''(t_j)$ of the complex audio signal, $S(t_j) = S'(t_j) + iS''(t_j)$. In some implementations, spectrograms $S(f_k)$ can include separate spectrograms for the amplitude $A(t_j)$ and the phase $(t_j)$ of the complex audio signal, $S(t_j) = A(t_j) e^{i\phi(t_j)}$.

F-frames 206 and T-frames 208 (also referred to, jointly, as the audio frames herein) can be processed using ESLM 132. In some implementations, the audio frames can be first converted from the spectrogram representation into a sound embedding representation, e.g., using a Wav2vec algorithm or some other similar waveform-to-embedding converter (not shown explicitly in FIG. 2A). An embedding (a feature vector) should be understood as any suitable digital representation of an input data, e.g., as a vector (string) of any number M of components, which can have integer values or floating-point values. Embeddings can be considered as vectors or points in an M-dimensional embedding space. The dimensionality M of the embedding space (defined as part of the ESLM 132 architecture) can be smaller than the size of the input data (the audio frames). During training, ESLM 132 learns to associate similar sets of training audio frames with similar embeddings represented by points closely situated in the embedding space and further learns to associate dissimilar sets of training audio frames with points that are located further apart in that space. In some implementations, a separate sound embedding (or a separate set of sound embeddings) can represent a given audio frame.

In some implementations, ESLM 132 can be (or include) a neural network, e.g., a deep neural network with multiple layers of neurons. A first (input) neuron layer ESLM 132 can receive the generated embeddings, process the embeddings, pass the output of the processing to the next layer, and so forth, until the last neuron layer ESLM 132 produces the final output, e.g., predictions 220. In some implementations, ESLM 132 can process multiple sound combinations concurrently or using batch processing.

In some implementations, ESLM 132 can include a convolutional neural network. In some implementations, convolutions can be performed across the time domain (across different frames) and across different embeddings corresponding to a given frame. In some implementations, some convolutional layers of ESLM 132 can be transposed convolutional layers. Some of the layers of ESLM 132 can be fully-connected (dense) layers. ESLM 132 can further include one or more skipped connections and one or more batch normalization layers.

Predictions 220 can include any suitable representation of estimated locations of sources of emergency signals (e.g., fire trucks, ambulances, police vehicles, etc.). Because of a relatively large wavelength of sound and the resulting diffraction and multiple scattering of sound from various objects in the environment, accuracy of predictions 220 can be lower than the accuracy of the direct line-of-sight optical (camera) detections or lidar/radar detections. In some implementations, the estimated locations of the sources of sound can be represented via probability maps (heatmaps) $P(X_i, Y_j; \tau)$ for a set of audio frames (F-frames 206 and T-frames 208) associated with a specific time $\tau$. Probability maps $P(X_i, Y_j; \tau)$ can characterize a probability that a particular region of space ("pixel") with coordinates $X_i$, $Y_j$ (of some suitable dimensions $\Delta X$, $\Delta Y$) is occupied by an EV that emits an emergency sound. Predictions 220 can further include an estimated velocity of the EV. In some implementations, the estimated velocity can similarly be outputted via another probability map $P(V_x, V_y; \tau)$ in the velocity space $V_x, V_y$. Some implementations can deploy the polar coordinates for the coordinate probability map $P(D, \theta; \tau)$ and/or the velocity probability map $P(V_D, V_\theta; \tau)$.

In some implementations, predictions 220 can also include one or more confidence scores, e.g., $C_D$, $C_\theta$, $C_V$, where $C_D$ is a confidence score describing confidence of ESLM 132 in the predicted distances to the EV, $C_\theta$ is a confidence score describing confidence of ESLM 132 in the predicted directions to the EV, and $C_V$ is a confidence score describing confidence of ESLM 132 in the predicted velocity of the EV. In some implementations, the outputted set of confidence scores can have fewer than three values (e.g., ESLM 132 can output a single aggregated confidence score characterizing the overall confidence in the coordinate-velocity predictions) or more than three values.

Predictions 220 can be provided to planner module 134 that combines coordinate and velocity probabilities maps with roadway layout data to identify likely locations of the EVs and performs EV motion simulations, as disclosed in more detail below in conjunction with FIG. 4.

In some implementations, prior to ESLM 132, an additional emergency sound identification model (ESIM) 205 can be deployed, e.g., as a gateway to ESLM 132. ESIM 205 can be a lightweight model with fewer number of neuron layers/neurons compared with ESLM 132 and can be trained using a smaller set of training data. ESIM 205 can quickly identify whether an emergency sound is audible. If no emergency sound is detected, ESLM 132 need not be deployed. This stops the perception and planning system of the AV from performing unnecessary processing under normal driving conditions. In some implementations, ESIM 205 can process F-frames 206 and/or T-frames 208. In some implementations, ESIM 205 can process frame different from F-frames 206 and/or T-frames 208, e.g., a set of low-resolution audio frames, with a smaller number N of Fourier components.

ESLM 132 and (if used) ESIM 205 can be trained by a training server 240. The model(s) can be trained using audio data 254, e.g., emergency sounds recorded in a variety of driving environments, including urban driving environments, highway driving environments, rural driving environments, off-road driving environments, and/or the like. In the instances of supervised training, training data can be annotated with ground truth 256, which can include locations and velocities of EVs emitting emergency sounds. In some implementations, annotations can be made using additional sensing data, e.g., one or more of lidar data 212, radar data 214, or camera data 216. Since most relevant audio data 254 can record sounds emitted by EVs that are not within the line-of-sight of a vehicle that records the audio data 254, the ground truth 256 can be generated using sensing data collected by a fleet of multiple vehicles operating in concert with the vehicle that records the audio data 254. For example, a fleet of vehicles $A_1, A_2, \ldots A_M$ can be deployed. As an emergency sound is detected by one of the vehicles, e.g., vehicle $A_1$, at least some of the other vehicles of the fleet, e.g., vehicle $A_2$, can have a direct line-of-sight to the EV emitting the sound and can accurately determine the location of the EV (as part of ground truth 256). In some implementations, e.g., where vehicle $A_2$ is an autonomous vehicle, the sensing data (lidar data 212, radar data 214, and/or camera data 216) can be processed by a trained object detection/classification model 230 to identify and locate the EV that emits the emergency sounds. In some implementations, an additional input into the object detection/classification model 230 can include roadway layout information 124, for accurate placement of the EV relative to the roadway. In some implementations, e.g., where vehicle $A_2$ is a human driver-operated vehicle, the (timestamped) sensing data can be recorded and subsequently processed offline, together with audio data 254 collected by vehicle $A_1$. The output of the object detection/classification model 230 can be stored as ground truth 256 (annotations) for audio data 254 in data repository 250.

Training of ESLM 132 and ESIM 205 can be performed by a training engine 242 hosted by training server 240, which can be an outside server that deploys one or more processing devices, e.g., central processing units (CPUs), graphics processing units (GPUs), and/or the like. In some implementations, one or both models can be trained by training engine 242 and subsequently downloaded onto the perception and planning system of the autonomous vehicle. Various models illustrated in FIG. 2A can be trained using training data that includes training inputs 244 and corresponding target outputs 246 (correct matches for the respective training inputs). During training of the models, training engine 242 can find patterns in the training data that maps each training input 244 to a respective target output 246.

Training engine 242 can have access to a data repository 250 that stores supervised audio data 254 and ground truth 256 for actual driving situations in a variety of environments. Training data stored in data repository 250 can include large datasets, e.g., with hundreds or thousands of sound recordings. During training, training server 240 can retrieve training data from data repository 250, generate one or more training inputs 244 and one or more target outputs 246 and use the training inputs 244 and target outputs 246 to train ESLM 132 and/or ESIM 205.

During training of the models, training engine 242 can change parameters (e.g., weights and biases) of the models until the models successfully learn how to perform respective tasks, e.g., to estimate locations and motions of sound-producing EVs (for ESLM 132) or identify presence of EV sounds in the audio data (for ESIM 205). In some implementations, different models of FIG. 2A can be trained separately. In some implementations, the models can be trained together (e.g., concurrently). Different models can have different architectures (e.g., different numbers of neuron layers and different topologies of neural connections), can have different settings (e.g., activation functions, etc.), and can be trained using different hyperparameters.

The data repository 250 can be a persistent storage capable of audio data 254, ground truth 256 for audio data, and any additional data, including lidar data 212, radar data 214, camera data (images) 216, and/or roadway layout information 124, as well as data structures that can be used to train the models operating, in accordance with various implementations of the present disclosure. Data repository 250 can be hosted by one or more storage devices, such as main memory, magnetic or optical storage disks, tapes, or hard drives, network-attached storage (NAS), storage area network (SAN), and so forth. Although depicted as separate from training server 240, in an implementation, the data repository 250 can be a part of training server 240. In some implementations, data repository 250 can be a network-attached file server, while in other implementations, data repository 250 can be some other type of persistent storage such as an object-oriented database, a relational database, and so forth, that can be hosted by a server machine or one or more different machines accessible to the training server 240 via a network (not shown in FIG. 2A).

In some implementations, in addition to F-frames 206 and T-frames, an input into ESLM 132 can include (in training and in inference) an auxiliary input 209, e.g., an embedding obtained by processing any of the sensing data collected by the sensing system of the AV, such as any of lidar data 212, radar data 214, camera data (images) 216, and/or roadway layout information 124. This auxiliary input 209 can provide additional context for processing the audio data input.

Figure 2B:
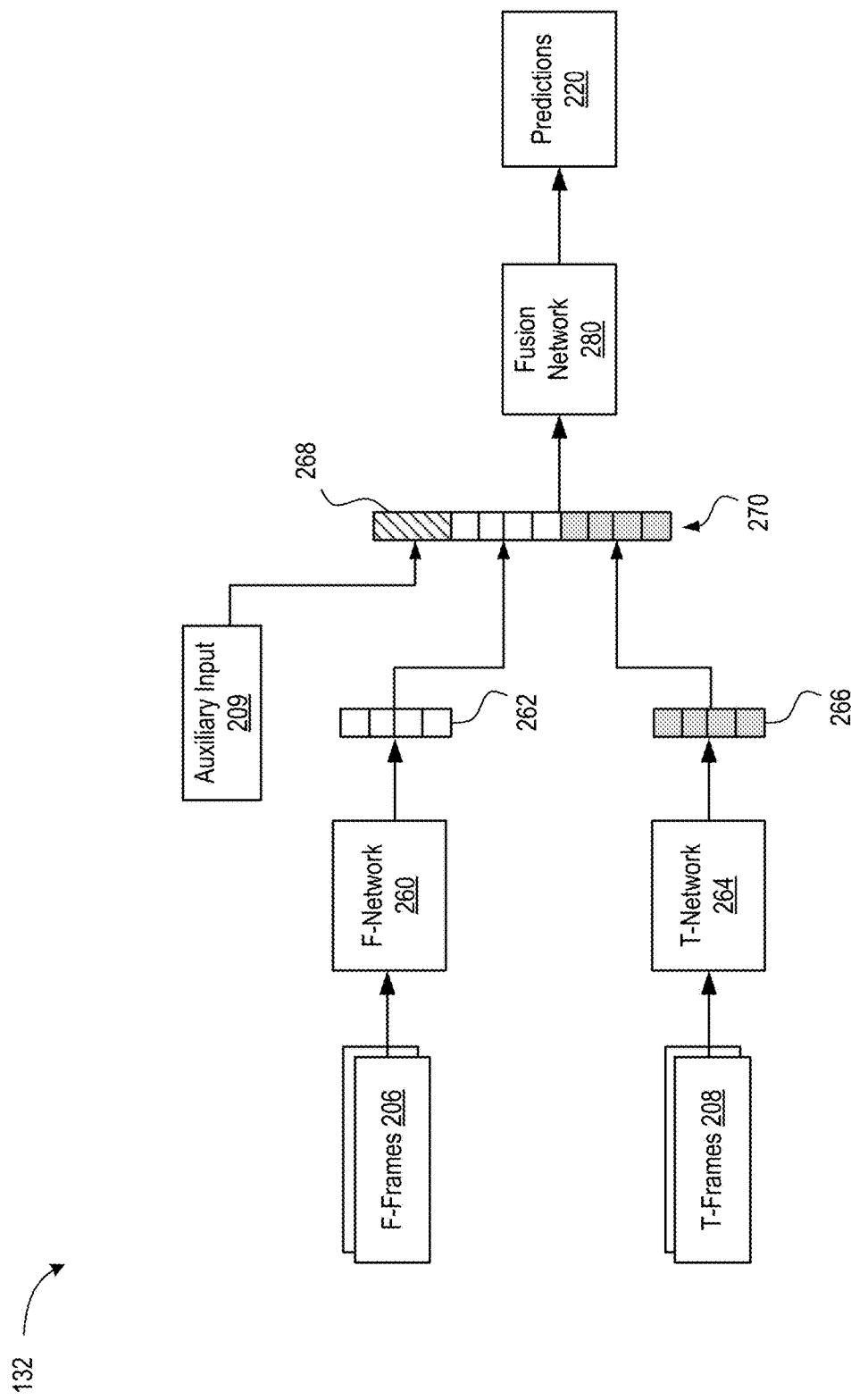
FIG. 2B is a diagram illustrating an example architecture of an emergency sound localization model that can be deployed as part of the detection, localization, and tracking pipeline of FIG. 2A, in accordance with some implementations of the present disclosure.

FIG. 2B is a diagram illustrating an example architecture of an emergency sound localization model 132 that can be deployed as part of the detection, localization, and tracking pipeline 200 of FIG. 2A, in accordance with some implementations of the present disclosure. As illustrated in FIG. 2B, ESLM 132 can include separate inputs to accept F-frames 206 and T-frames 208. F-network 260 can process F-frames 206 or some suitable representation (e.g., embeddings) of F-frames 206. Similarly, T-network 264 can process T-frames 208 or some representation of F-frames 206. Each of F-network 260 and T-network 264 can process corresponding inputs and generate intermediate embeddings 262 and 266. The intermediate embeddings 262 and 266 can be aggregated, e.g., concatenated, into a fused embedding 270. In those implementations where an auxiliary input 209 is used, an embedding 268 associated with the auxiliary input 209 can also be combined into the fused embedding 270. The fused embedding 270 can then be processed by a fusion network 280 that outputs predictions 220.

In some implementations, F-network 260 and T-network 264 can be or include convolutional neural networks. Fusion network 280 can be or include one or more fully-connected layers and a final classifier layer. Inputs into F-network 260 and T-network 264 can include frames obtained by processing audio data collected from one, some, or all audio sensors (e.g., audio sensors 202 of FIG. 2A) of an AV. Training of ESLM 132 can include dropout techniques. More specifically, inputs from at least some of the audio sensors can be turned off (e.g., replaced with zeros). The audio sensors can be selected for dropout based on any predetermined schedule or randomly. For example, if the AV deploys two arrays of three microphones each, one or two microphones can be turned off for a given training epoch. During some (e.g., randomly chosen) epochs, audio data from all microphones can be used as input into ESLM 132. In some implementations, the dropout can be implemented as part of application of a suitable loss function, such as a cross-entropy loss function, and/or the like, e.g., by weighing a contribution from one or more microphones with a small weight, which can be zero. The dropout techniques can have multiple advantages. In particular, such techniques train ESLM 132 for situations where one or more microphones and/or microphone arrays stop functioning. Additionally, the dropout techniques condition ESLM 132 to become more efficient in using input data of individual microphones/arrays.

In some implementations, microphone arrays that are used to generate the audio frames can have three or more synchronized microphones per array, with the microphones in the array positioned at vertices of a triangle (rather than) along a single line. Such microphone arrays are capable of fully disambiguating sounds arriving from different directions. Consequently, a single time-synchronized array with three or more microphones can be used to generate the audio frames that are used as an input into ESLM 132. In some implementations, it can be more cost-effective to deploy two-microphone arrays. A two-microphone array may be unable to disambiguate sound waves arriving along opposite directions of the center line that is perpendicular to the line connecting the two microphones. In such implementations, two or more two-microphone arrays, even when not time-synchronized between different arrays, but positioned along different (e.g., perpendicular) lines can provide ESLM 132 with audio information that is sufficient to disambiguate directions of arrival of sound waves.

Figure 3:
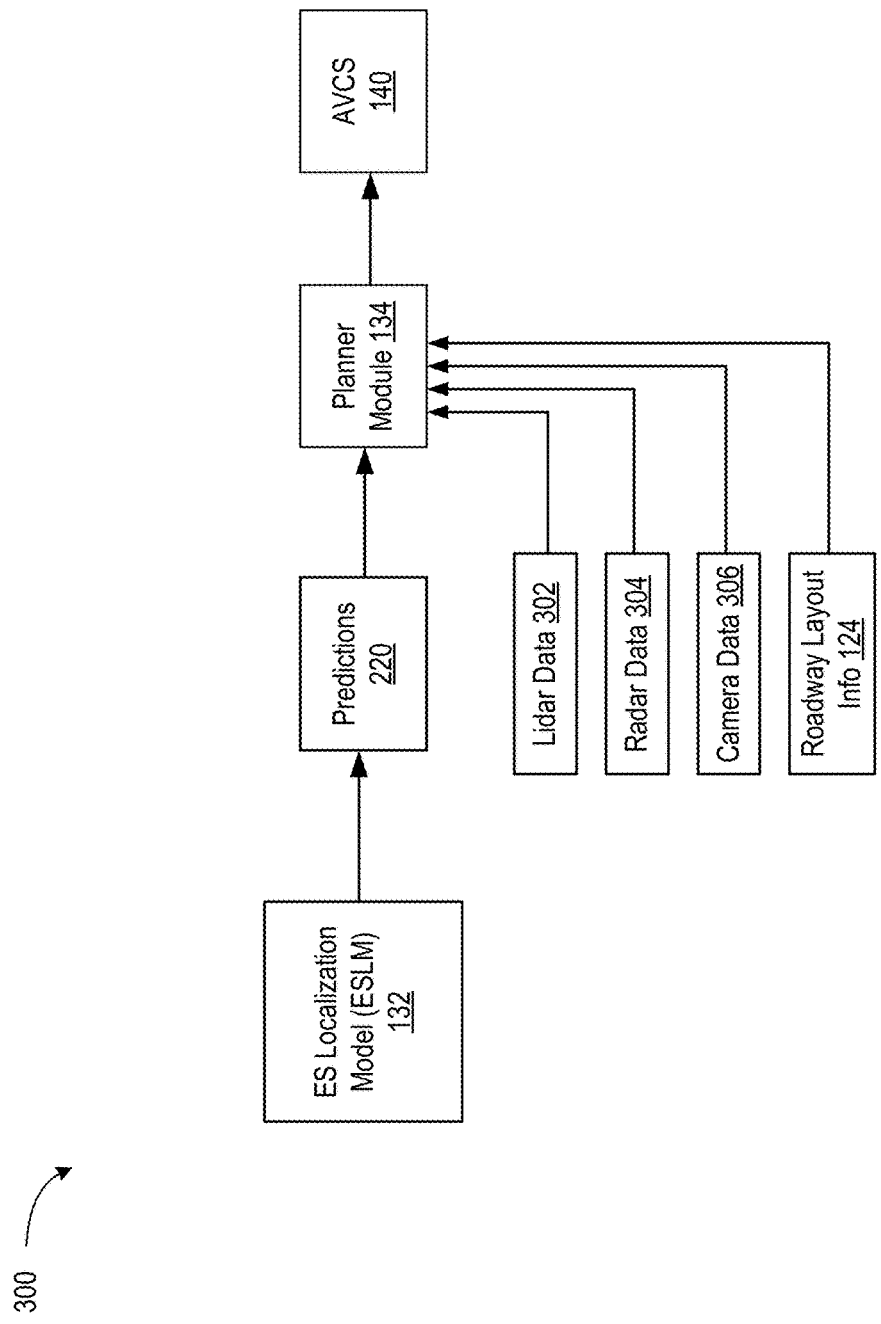
FIG. 3 illustrates an example data flow of audio and sensing data processing for behavior prediction that uses an emergency sound localization model for driving path selection in autonomous driving applications, in accordance with some implementations of the present disclosure.

FIG. 3 illustrates an example data flow 300 of audio and sensing data processing for behavior prediction that uses an emergency sound localization model for driving path selection in autonomous driving applications, in accordance with some implementations of the present disclosure. Predictions, generated by ESLM 132 (e.g., as disclosed in conjunction with FIG. 2A-2B above), such as position probability maps $P(D, \theta; \tau)$ and/or velocity probability maps $P(V_D, V_\theta; \tau)$ for different timestamps t (e.g., corresponding to the beginning, center, or end of a sliding window used to generate a given set of audio frames), can be provided to planner module 134. Additionally, planner module 134 can receive live (electromagnetic) sensing data collected by the sensing system of the AV. For example, the sensing data can include one, some, or all of lidar data 302 (generated by lidar 112 in FIG. 1), radar data 304 (generated by radar 114 in FIG. 1), and/or camera data 306 (generated by camera(s) 118 in FIG. 1). The sensing data can identify a visible portion of the environment where presence of an EV can be ruled out, e.g., based on the absence of flashing lights on the vehicles located within the visible portion, visual appearance of the vehicles not matching appearance of known EVs, and/or the like.

Figure 4:
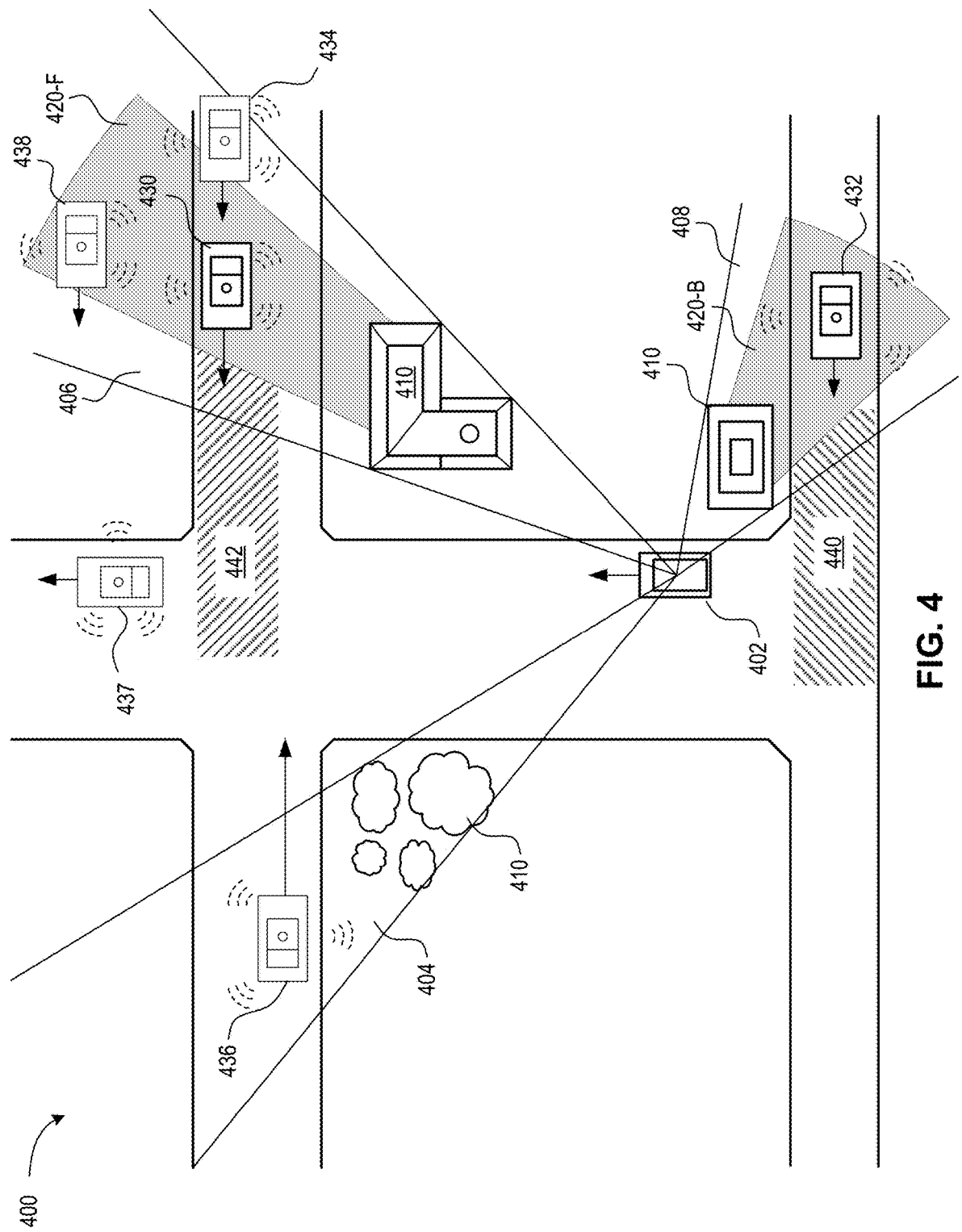
FIG. 4 illustrates an example environment of an autonomous vehicle that can deploy an emergency sound localization model for driving path selection in autonomous driving applications, in accordance with some implementations of the present disclosure.

FIG. 4 illustrates an example environment 400 of an autonomous vehicle 402 that can deploy an emergency sound localization model for driving path selection in autonomous driving applications, in accordance with some implementations of the present disclosure. As illustrated in FIG. 4, AV 402 detects the presence of emergency sounds emitted by an emergency vehicle within the environment 400. The planner module 134 (with reference to FIG. 3) can identify occluded areas of the environment, e.g., areas 404, 406, and 408 occluded by various objects 410 (e.g., buildings, structures, trees and plants, road signs, and/or the like). Correspondingly, planner module 134 can determine (based on examination of visible areas of the environment 400) that the EV is currently located within occluded areas 404, 406, and 408. Planner module 134 can apply the position probability map $P(D, \theta; t_j)$ to the occluded areas 404, 406, and 408. This can allow planner module 134 to limit possible locations of the EV to candidate areas 420 that represent an intersection of the occluded areas with portions of environment 400 where the position probability is at or above some threshold probability: $P(D, \theta; t_j) \geq P_T$. The threshold probability $P_T$ can be set empirically, e.g., at 30%, 50%, 65%, or some other value. The intersection areas 420 are illustrated with uniform shading. For example, based on the probability map $P(D, \theta; t_j)$, planner module 134 can determine that the emergency sound is coming from the right of the AV and not from the left of the AV and can thus eliminate occluded area 404. Correspondingly, planner module 134 can limit possible locations of the EV to a forward candidate area 420-F and a back candidate area 420-B.

The BP module can further eliminate at least some of the portions of the occluded areas based on roadway layout information 124, e.g., by excluding undrivable areas of the occluded areas, such as land occupied by buildings or structures, fenced-off land, impassable land, and/or the like. For example, only portions of candidate areas 420-F and 420-B that overlap with the roadway (obtained using roadway layout information 124) can be considered as possible candidate locations of the EV. As illustrated in FIG. 4, simulated EV 430 can then be placed in the candidate areas 420-A and 420-B whereas other locations can be ruled out, e.g., simulated EV 434 can be excluded as a low-probability location and simulated EV 438 can be excluded as an off-road location.

The target space can include areas that are (i) occluded, (ii) drivable, and (iii) are characterized by at least a minimum (threshold) probability $P(D, \theta; \tau)$ of having an EV thereon. This target space represents a hypotheses space of possible EV locations (for a given time t). A set of simulated EVs can then be placed at various locations of the target space, e.g., simulated EV 430, simulated EV 432, and so on, and each simulated EV can further be given some simulated velocity. The simulated velocity can be subject to one or more constraints. One constraint can be due to a specific road layout (obtained as part of roadway layout information 124), restricting the motion of simulated EVs to a drivable space. A drivable space can include roads, driveways, parking lots, and drivable off-road surfaces, such as sidewalks. A drivable space can exclude driving paths that cross physical obstacles, such as buildings, structures (e.g., bus stops), poles, trees, road signs, bushes, curbs exceeding a particular height (e.g., 30 cm), and various other obstacles that an EV cannot physically overcome. The road layout constraint need not include the condition that a simulated EV be on a correct side of the road as EVs can travel against traffic. Another constraint can be due to the computed probability map $P(V_D, V_\theta; \tau)$, with various values $V_D, V_\theta$ that are predicted with a probability below some (e.g., empirically set) threshold excluded from simulations. For example, if the velocity probability map $P(V_D, V_\theta; \tau)$ superimposed on location probability $P(D, \theta; \tau)$ indicates that the EV is moving away from the AV in certain areas (e.g., occluded areas), such areas may be excluded from further simulations. On the other hand, the velocities of simulated EVs need not be constrained by the maximum legal speed for the environment (or an average speed of other vehicles in that environment).

In some implementations, the simulations can be performed using one or more Monte Carlo techniques. For example, multiple simulated EVs can be selected (sampled, created) and placed in the target space, e.g., subject to the above conditions (i)-(iii). Sampling can be based on the computed position probability $P(D, \theta; \tau)$ and the simulated EVs can be assigned velocities based on the computed velocity probability $P(V_D, V_\theta; \tau)$. The simulated EVs can then follow some simulated trajectory for a certain target time, e.g., 1 second, 2 seconds, 3 seconds, or some other time. In one example implementation, the trajectories can be simulated based on the assumption that the simulated EVs maintain the assigned velocity for the target time. Planner module 134 can then identify a set of locations—an EV-active area—where the simulated EVs can be at or after the target time (or before the expiration of the target time). In one example, EV-active area can then be passed on to the AVCS (e.g., AVCS 140, with reference to FIG. 3) and the AVCS can control the driving path of the AV so that the AV avoids entering (or approaching) the EV-active area.

Controlling the driving path of the AV can include maintaining the current driving path of the AV (e.g., if it is determined that the AV is not to enter the EV-active area within the target time, if the current driving path is maintained) or modifying the current driving path of the AV by braking, changing a roadway position (e.g., moving to the side of the road), moving away from the EV-active area (e.g., taking a turn to a side street or otherwise rerouting the AV), and/or the like (if it is determined that the AV is to enter the EV-active area during the target time or be from the EV-active area within less than a certain (empirically set) distance, e.g., 20 m, if the current driving path is maintained. For example, the simulations performed by the BP module (e.g., planner module 134 in FIG. 3) can determine that simulated EV 432 is behind AV 402 and that AV 402 is moving away from back EV-active area 440 (associated with possible trajectories of simulated EV 432). The planner module can then determine that the EV traveling on a road that is behind AV 402 does not interfere with the trajectory of AV 402. The AVCS can then maintain the current driving path of AV 402, at least until a later time, when additional audio data and/or other sensing data indicates that the EV has made a right turn and is catching up with AV 402. (In which case the EV-active areas can be dynamically re-evaluated and the modified EV-active area 440 may extend to the new location of AV 402.) At the same time, the simulations performed by the planner module can determine that simulated EV 430 is ahead of AV 402 and that both simulated EV 430 and AV 402 are moving towards the same intersection that overlaps with a forward EV-active area 442 (associated with possible trajectories of simulated EV 430) and which AV 402 is soon to enter. The planner module can then provide instructions to the AVCS to slow AV 402 down and ensure that AV 402 is not to reach the intersection before simulated EV 430 passes. Correspondingly, planner module 134 can provide instructions to the AVCS to bring AV 402 to a stop (or otherwise cause the AVCS to slow/stop AV 402).

In some implementations, to respond to the presence of a potential EV as early as possible and to timely yield (e.g., by pulling over) to the EV located behind AV 402, the decision to stop/pull over may be based on a comparison of the estimated distance to the EV to predetermined threshold distance D and/or threshold time T. For example, if the estimated (e.g., based on the position probability) distance to the simulated EV is less than D (e.g., 75 m) or if the estimated (e.g., based on both the position probability and the velocity probability) that the simulated EV could reach AV 402 within time T (e.g., 5 seconds), the AVCS of AV 402 will cause the AV to pull over, stop, and/or the like. This can be performed even in situations where the simulated EV is not directly behind AV 402 but is still separated from AV 402 by one or more turns, provided that there is a conceivable likelihood that the EV can nonetheless catch up with the AV within time T.

The operations described above can be repeated for one or more subsequent times τ, e.g., every second, two seconds, half a second, or any other set interval of time. Sliding window techniques can be used to obtain audio frames for subsequent times t. A new set of predictions 220 (as well as a new set of lidar/radar/camera data and the updated roadway layout information) can then be used by the BP module to run a new set of simulations and update the expected EV-active areas and adjust the driving path of the AV accordingly.

In some implementations, the roadway layout information 124 is not used (e.g., can be unavailable). In such instances, planner module 134 does not know the exact road layout in the occluded areas of the driving environment. Correspondingly, planner module 134 can assume that the entire extent of the occluded areas is drivable and can place simulated EVs anywhere within the occluded areas, which can further be subject to constraints provided by the probability maps generated by ESLM 132.

In some instances, e.g., because of the presence of noise in the environment or as a result of multiple reflections of sound from buildings and other objects, a confidence score C outputted by ESLM 132, as part of predictions 220, and characterizing a confidence of ESLM 132 in the predicted probability maps can be below a certain minimum confidence $C_{MIN}$. In some implementations, the confidence score C can be a global confidence score computed as a combination of individual confidence scores $C_D$, $C_\theta$, $C_V$ outputted by ESLM 132 separately for individual predictions. For example, the confidence score C can be an average (e.g., arithmetic average, geometric average, and/or the like) or a weighted average of the individual confidence scores. In low confidence instances, $C<C_{MIN}$, planner module 134 can run simulations with EVs placed in the entire occluded area not visible to the sensing system (possibly, subject to roadway layout constraints, if available). For example, additional simulated EVs 434, 436, and 438 can then be sampled, together with simulated EVs 430 and 432.

In some implementations, other techniques of operating an AV in the presence of sounds of EVs can be used in addition to the techniques disclosed above. More specifically, such additional techniques can include bringing the AV to a stop (or slowing the AV down to some set speed, e.g., 5 mph or similar) if the most likely distance from the EV, as estimated based on the location probability map outputted by ESLM 132 is less than a minimum distance, e.g., 75 m, 100 m, and/or the like. Additional techniques can include bringing the AV to a stop or slowing the AV down whenever the source of the EV sound is approaching the AV, e.g., based on the location probability maps generated for two or more consecutive times. Additional techniques can include bringing the AV to a stop or slowing the AV down whenever the source of the emergency sound is not detectable using direct line-of-sight electromagnetic sensing data.

Figure 5:
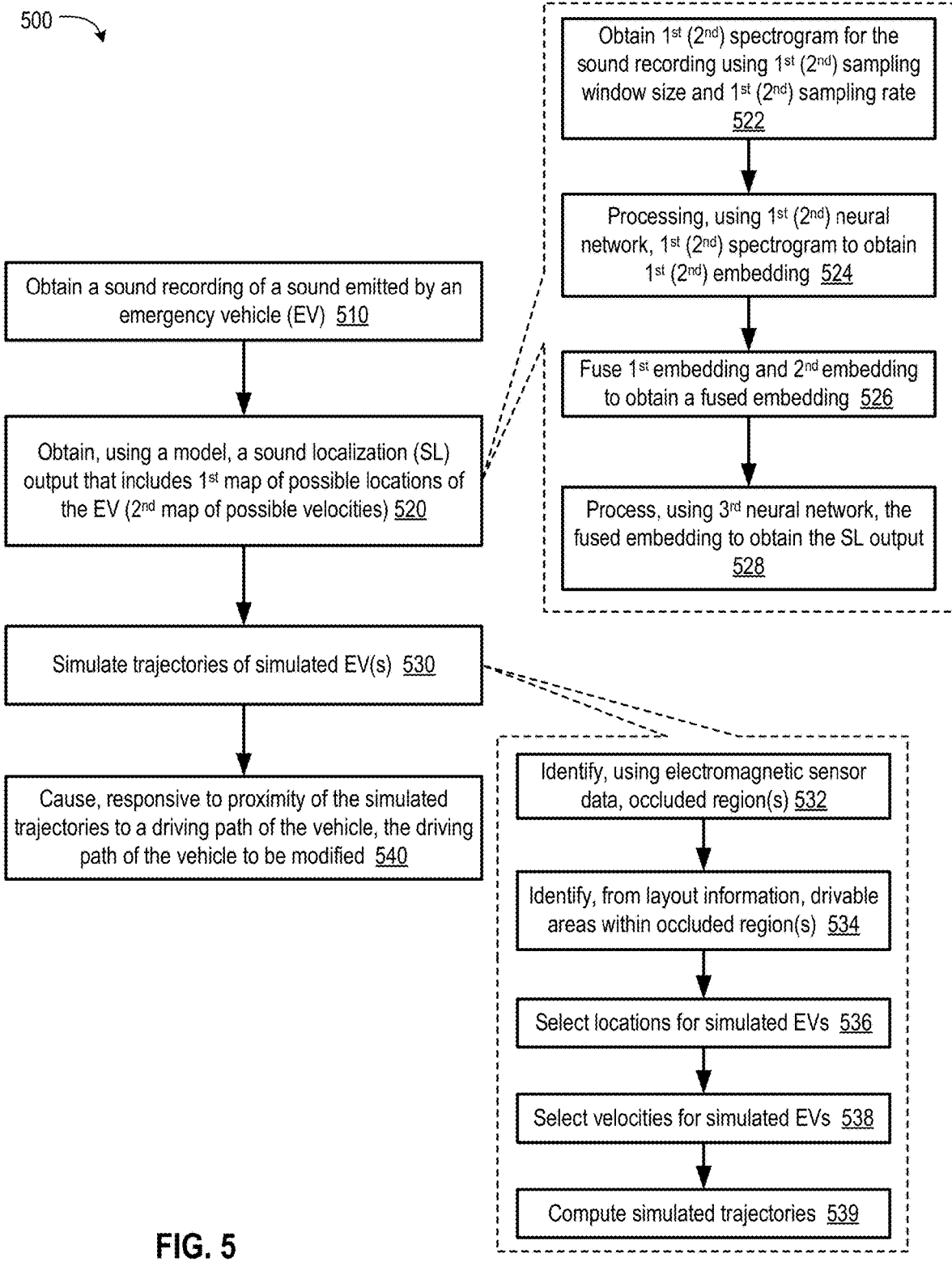
FIG. 5 illustrates a method of controlling a vehicle's driving path in the presence of sounds of emergency vehicles, in accordance with some implementations of the present disclosure.

FIG. 5 illustrates a method 500 of controlling a vehicle's driving path in the presence of sounds of emergency vehicles, in accordance with some implementations of the present disclosure. A processing device, having one or more processing units (CPUs), and/or one or more graphics processing units (GPUs), and memory devices communicatively coupled to the CPU(s) and/or GPUs can perform method 500 and/or each of its individual functions, routines, subroutines, or operations. Method 500 can be directed to systems and components of a vehicle. In some implementations, the vehicle can be an autonomous vehicle (AV), such as AV 100 of FIG. 1. In some implementations, the vehicle can be a driver-operated vehicle equipped with driver assistance systems, e.g., Level 2 or Level 3 driver assistance systems, that provide limited assistance with specific vehicle systems (e.g., steering, braking, acceleration, etc. systems) or under limited driving conditions (e.g., highway driving). The processing device executing method 500 can perform instructions issued by various components of the perception and planning system 130 of FIG. 1, e.g., ESLM 132, planner module 134, and/or the like. Method 500 can be used to improve performance of the autonomous vehicle control system 140. In certain implementations, a single processing thread can perform each of method 500. Alternatively, two or more processing threads can perform each of method 500, each thread executing one or more individual functions, routines, subroutines, or operations of the methods. In an illustrative example, the processing threads implementing method 500 can be synchronized (e.g., using semaphores, critical sections, and/or other thread synchronization mechanisms). Alternatively, the processing threads implementing method 500 can be executed asynchronously with respect to each other. Various operations of method 500 can be performed in a different (e.g., reversed) order compared with the order shown in FIG. 5. Some operations of method 500 can be performed concurrently with other operations. Some operations can be optional.

At block 510, method 500 can include obtaining, using one or more audio detectors of a vehicle, a sound recording that includes a sound emitted by an emergency vehicle (EV). The sound recording can include multiple files, e.g., a separate file recorded by each audio detector (microphone). At block 520, method 500 can continue with applying a sound localization (SL) model (e.g., ESLM 132) to the sound recording to obtain a SL output (e.g., predictions 220). The SL output can include a first map of possible locations of the EV in the driving environment of the vehicle. For example, the first map can include a probabilistic occupancy, by the EV, of a plurality of locations of the driving environment of the vehicle. In some implementations, the probabilistic occupancy can include probabilities that the EV occupies various locations $\vec{R}$. In some implementations, the probabilistic occupancy can include probabilities for various individual locations $\vec{R}$ to be occupied by the EV.

In some implementations, the SL output can include a second map of possible velocities of the EV. For example, the second map can include a plurality of probabilities, each of the probabilities characterizing a likelihood that the EV is moving with a respective velocity V of a plurality of velocities.

In some implementations, simulating trajectories of the one or more simulated EVs can include operations illustrated with the top callout portion of FIG. 5. More specifically, applying the SL model to the sound recording can include, at block 522, obtaining a first spectrogram for the sound recording and a second spectrogram for the sound recording. The first spectrogram (e.g., F-frame 206) can be obtained using a first sampling window size and a first sampling rate. The second spectrogram (e.g., T-frame 208) can be obtained using a second sampling window size and a second sampling rate. The first sampling window size can be greater than the second sampling window size and the first sampling rate can be smaller than the second sampling rate.

At block 524, the first spectrogram and the second spectrogram can be processed using the SL model. For example, the first spectrogram can be processed using a first neural network (e.g., F-network 260 in FIG. 2B) that outputs a first embedding (e.g., intermediate embedding 262 in FIG. 2B). Similarly, the second spectrogram can be processed using a second neural network (e.g., T-network 208 in FIG. 2B) that generates a second embedding (e.g., intermediate embedding 266 in FIG. 2B). At block 526, method 500 can continue with fusing the first embedding and the second embedding to obtain a fused embedding (e.g., fused embedding 270 in FIG. 2B). A block 528, method 500 can include processing, using a third neural network (e.g., fusion network 280, in FIG. 2B) the fused embedding to obtain the SL output.

At block 530 method 500 can include simulating, using the SL output, trajectories of one or more simulated EVs in the driving environment of the vehicle. In some implementations, simulating trajectories of one or more simulated EVs can include operations illustrated with the bottom callout portion of FIG. 5. More specifically, at block 532, method 500 can identify, using electromagnetic sensor data collected by a sensing system of the vehicle, one or more occluded regions of the driving environment of the vehicle. The electromagnetic sensor data can be or include lidar data, radar data, camera data, and/or the like. At block 534 method 500 can include identifying, using a road layout information, drivable areas within the one or more occluded regions.

At block 536, method 500 can continue with simulating locations for the one or more simulated EVs. In some implementations, the selected locations of the one or more simulated EVs can be selected within the identified drivable areas and/or within the one or more occluded regions. In some implementations, the SL output can further include a confidence score. In some implementations, responsive to the confidence score being less than a threshold confidence score, method 500 can include disregarding the first map in selecting the locations of the one or more simulated EVs. In some implementations, selecting locations for the one or more simulated EVs can be performed using the first map. At block 538, method 500 can include selecting velocities for the one or more simulated EVs using the second map. At block 539, method 500 can continue with computing the simulated trajectories using the selected locations and the selected velocities.

At block 540, method 500 can continue with causing, responsive to proximity of one or more of the simulated trajectories to a driving path of the vehicle, the driving path of the vehicle to be modified. The proximity of the one or more of the simulated trajectories to the driving path of the vehicle can mean that a distance from the vehicle, projected to follow the driving path over a predetermined time, to the one or more of the simulated trajectories is less than a predetermined distance (e.g., less than 30 m, 50 m, etc.).

In some implementations, the SL model can be trained using a plurality of training sound recordings obtained by a plurality of audio sensors. During at least one training epoch, one or more training sound recordings of the plurality of training sound recordings can be replaced with null inputs into the SL model.

Figure 6:
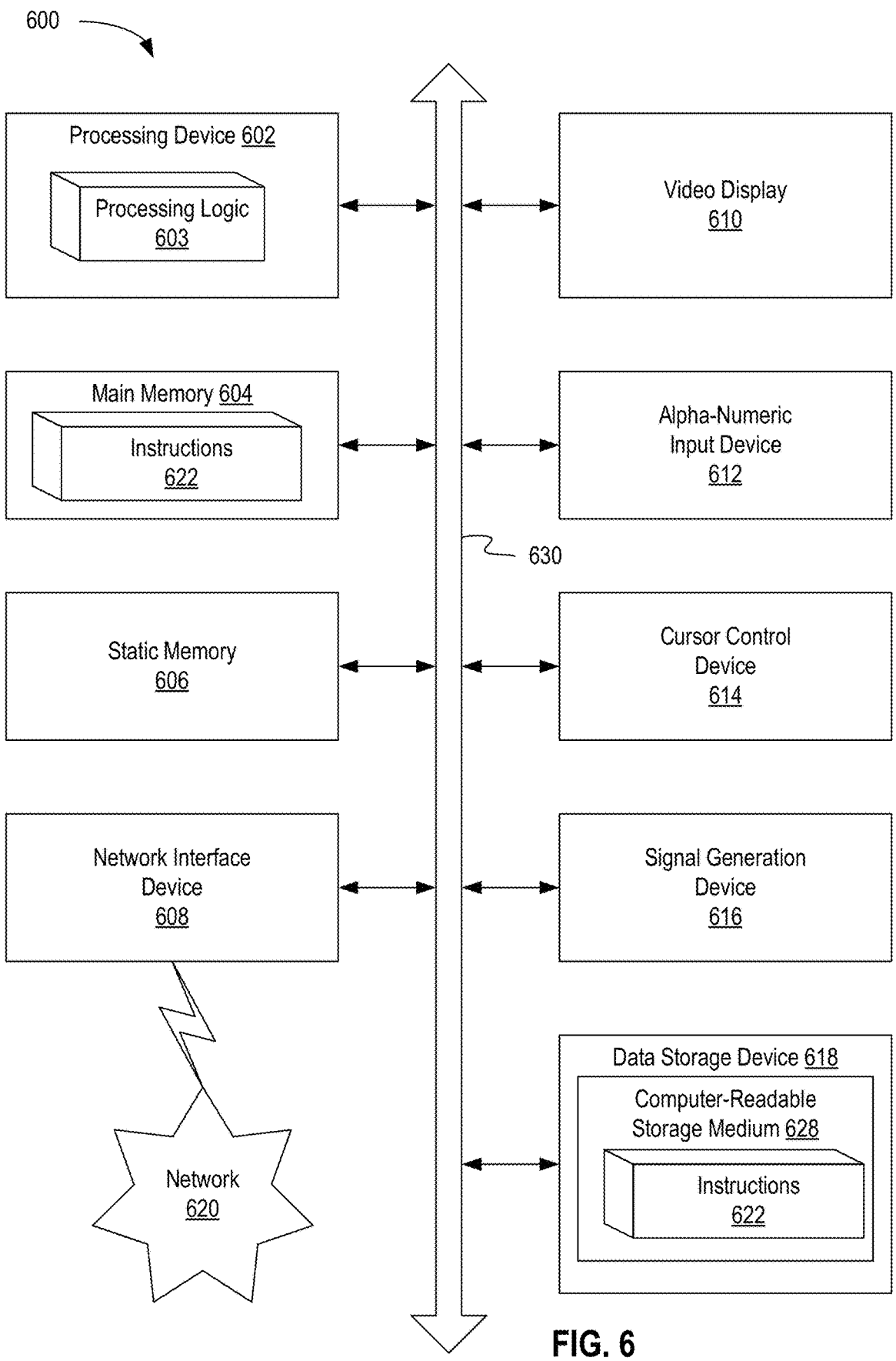
FIG. 6 depicts a block diagram of an example computer device capable of supporting sound-based emergency vehicle detection, localization, and tracking pipeline that can be used as part of an autonomous vehicle's perception system, in accordance with some implementations of the present disclosure.

FIG. 6 depicts a block diagram of an example computer device 600 capable of supporting sound-based emergency vehicle detection, localization, and tracking pipeline that can be used as part of an autonomous vehicle's perception and planning system, in accordance with some implementations of the present disclosure. Example computer device 600 can be connected to other computer devices in a LAN, an intranet, an extranet, and/or the Internet. Computer device 600 can operate in the capacity of a server in a client-server network environment. Computer device 600 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 600 can include a processing device 602 (also referred to as a processor or CPU), a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory (e.g., a data storage device 618), which can communicate with each other via a bus 630.

Processing device 602 (which can include processing logic 603) represents one or more general-purpose processing devices such as a microprocessor, central processing unit, or the like. More particularly, processing device 602 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 602 can be configured to execute instructions performing method 500 of controlling a vehicle's driving path in the presence of sounds of emergency vehicles.

Example computer device 600 can further comprise a network interface device 608, which can be communicatively coupled to a network 620. Example computer device 600 can further comprise a video display 610 (e.g., a liquid crystal display (LCD), a touch screen, or a cathode ray tube (CRT)), an alphanumeric input device 612 (e.g., a keyboard), a cursor control device 614 (e.g., a mouse), and an acoustic signal generation device 616 (e.g., a speaker).

Data storage device 618 can include a computer-readable storage medium (or, more specifically, a non-transitory computer-readable storage medium) 628 on which is stored one or more sets of executable instructions 622. In accordance with one or more aspects of the present disclosure, executable instructions 622 can comprise executable instructions performing method 500 of controlling a vehicle's driving path in the presence of sounds of emergency vehicles.

Executable instructions 622 can also reside, completely or at least partially, within main memory 604 and/or within processing device 602 during execution thereof by example computer device 600, main memory 604 and processing device 602 also constituting computer-readable storage media. Executable instructions 622 can further be transmitted or received over a network via network interface device 608.

While the computer-readable storage medium 628 is shown in FIG. 6 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, $C_D$-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
    obtaining, using one or more audio detectors of a vehicle, a sound recording comprising a sound emitted by an emergency vehicle (EV);
    applying, using a processing device, a sound localization (SL) model to the sound recording to generate an SL output, wherein the SL output comprises a first map of possible locations of the EV in a driving environment of the vehicle;
    simulating, by the processing device and using the SL output, trajectories of one or more simulated EVs in the driving environment of the vehicle;
    causing, responsive to proximity of one or more of the simulated trajectories to a driving path of the vehicle, the driving path of the vehicle to be modified; and
    controlling the vehicle based on the modified driving path.

2. The method of claim 1, wherein the first map comprises a probabilistic occupancy, by the EV, of a plurality of locations of the driving environment of the vehicle.

3. The method of claim 2, wherein the SL output comprises a second map of possible velocities of the EV.

4. The method of claim 3, wherein the second map comprises a plurality of probabilities, wherein each of the plurality of probabilities characterizes a likelihood that the EV is moving with a respective velocity of a plurality of velocities, and wherein simulating trajectories of the one or more simulated EVs comprises:
    selecting, using the first map, locations for the one or more simulated EVs;
    selecting, using the second map, velocities for the one or more simulated EVs; and computing the simulated trajectories using the selected locations and the selected velocities.

5. The method of claim 1, wherein applying the SL model to the sound recording comprises:
   obtaining a first spectrogram for the sound recording, the first spectrogram obtained using a first sampling window size and a first sampling rate;
   obtaining a second spectrogram for the sound recording, the second spectrogram obtained using a second sampling window size and a second sampling rate, wherein the first sampling window size is greater than the second sampling window size, and wherein the first sampling rate is smaller than the second sampling rate; and
   processing, using the SL model, the first spectrogram and the second spectrogram.

6. The method of claim 5, wherein processing the first spectrogram and the second spectrogram comprises:
   processing, using a first neural network, the first spectrogram to obtain a first embedding;
   processing, using a second neural network, the second spectrogram to obtain a second embedding;
   fusing the first embedding and the second embedding to obtain a fused embedding; and
   processing, using a third neural network, the fused embedding to obtain the SL output.

7. The method of claim 1, wherein simulating trajectories of one or more simulated EVs comprises:
   identifying, using electromagnetic sensor data collected by a sensing system of the vehicle, one or more occluded regions of the driving environment of the vehicle, wherein the electromagnetic sensor data comprises one or more of:
   lidar data,
   radar data, or
   camera data; and
   selecting locations of the one or more simulated EVs within the one or more occluded regions.

8. The method of claim 7, further comprising:
   identifying, using a road layout information, drivable areas within the one or more occluded regions; and
   wherein the selected locations of the one or more simulated EVs are selected within the identified drivable areas.

9. The method of claim 7, wherein the SL output further comprises a confidence score, the method further comprises:
   responsive to the confidence score being less than a threshold confidence score, disregarding the first map in selecting the locations of the one or more simulated EVs.

10. The method of claim 1, wherein the proximity of the one or more of the simulated trajectories to the driving path of the vehicle comprises a distance from the vehicle, projected to follow the driving path over a predetermined time, to the one or more of the simulated trajectories being less than a predetermined distance.

11. The method of claim 1, wherein the SL model is trained using a plurality of training sound recordings obtained by a plurality of audio sensors, and wherein during at least one training epoch, one or more training sound recordings of the plurality of training sound recordings are replaced with null inputs into the SL model.

12. A system comprising:
   a sensing system of a vehicle, the sensing system comprising one or more audio detectors configured to:
   obtain a sound recording comprising a sound emitted by an emergency vehicle (EV); and
   a perception system of the vehicle, the perception system configured to:
   apply a sound localization (SL) model to the sound recording to obtain an SL output, wherein the SL output comprises a first map of possible locations of the EV in a driving environment of the vehicle;
   simulate, using the SL output, trajectories of one or more simulated EVs in the driving environment of the vehicle;
   cause, responsive to proximity of one or more of the simulated trajectories to a driving path of the vehicle, the driving path of the vehicle to be modified; and
   control the vehicle based on the modified driving path.

13. The system of claim 12, wherein the first map comprises a probabilistic occupancy, by the EV, of a plurality of locations of the driving environment of the vehicle, and wherein the SL output comprises a second map of possible velocities of the EV.

14. The system of claim 13, wherein the second map comprises a plurality of probabilities, wherein each of the plurality of probabilities characterizes a likelihood that the EV is moving with a respective velocity of a plurality of velocities, and wherein to simulate trajectories of the one or more simulated EVs, the perception system is configured to:
   select, using the first map, locations for the one or more simulated EVs;
   select, using the second map, velocities for the one or more simulated EVs; and
   compute the simulated trajectories using the selected locations and the selected velocities.

15. The system of claim 12, wherein to apply the SL model to the sound recording, the perception system is to:
   obtain a first spectrogram for the sound recording, the first spectrogram obtained using a first sampling window size and a first sampling rate;
   obtain a second spectrogram for the sound recording, the second spectrogram obtained using a second sampling window size and a second sampling rate, wherein the first sampling window size is greater than the second sampling window size, and wherein the first sampling rate is smaller than the second sampling rate; and
   process, using the SL model, the first spectrogram and the second spectrogram.

16. The system of claim 12, wherein to simulate trajectories of one or more simulated EVs the perception system is to:
   identify, using electromagnetic sensor data collected by a sensing system of the vehicle, one or more occluded regions of the driving environment of the vehicle, wherein the electromagnetic sensor data comprises one or more of:
   lidar data,
   radar data, or
   camera data; and
   select locations of the one or more simulated EVs within the one or more occluded regions.

17. The system of claim 16, wherein the perception system is further configured to:
   identify, using a road layout information, drivable areas within the one or more occluded regions; and
   wherein the selected locations of the one or more simulated EVs are selected within the identified drivable areas.

18. The system of claim 16, wherein the SL output further comprises a confidence score, and wherein the perception system is further to:

responsive to the confidence score being less than a threshold confidence score, disregarding the first map in selecting the locations of the one or more simulated EVs.

19. The system of claim 12, wherein the SL model is trained using a plurality of training sound recordings obtained by a plurality of audio sensors, and wherein during at least one training epoch, one or more training sound recordings of the plurality of training sound recordings are replaced with null inputs into the SL model.

20. A non-transitory computer-readable storage medium storing instructions that, when executed by a processing device cause the processing device to perform operations comprising:
   obtaining, using one or more audio detectors of a vehicle, a sound recording comprising a sound emitted by an emergency vehicle (EV);
   applying a sound localization (SL) model to the sound recording to generate an SL output, wherein the SL output comprises a first map of possible locations of the EV in a driving environment of the vehicle;
   simulating, using the SL output, trajectories of one or more simulated EVs in the driving environment of the vehicle;
   causing, responsive to proximity of one or more of the simulated trajectories to a driving path of the vehicle, the driving path of the vehicle to be modified; and
   controlling the vehicle based on the modified driving path.

* * * * *